(12) United States Patent
Nishimori

(10) Patent No.: US 10,684,210 B2
(45) Date of Patent: Jun. 16, 2020

(54) MONITORING DEVICE FOR ADJUSTING LIGHT IRRADIATION IN PARTICLE ANALYSIS APPARATUS

(71) Applicant: HORIBA, Ltd., Kyoto-shi, Kyoto (JP)

(72) Inventor: Masashi Nishimori, Kyoto (JP)

(73) Assignee: HORIBA, Ltd., Kyoto-shi, Kyoto (JP)

( * ) Notice: Subject to any disclaimer, the term of this patent is extended or adjusted under 35 U.S.C. 154(b) by 0 days.

(21) Appl. No.: 16/034,722

(22) Filed: Jul. 13, 2018

(65) Prior Publication Data

US 2019/0017920 A1    Jan. 17, 2019

(30) Foreign Application Priority Data

Jul. 14, 2017    (JP) .................................. 2017-138407

(51) Int. Cl.
 G01N 15/14    (2006.01)
 G01N 15/10    (2006.01)

(52) U.S. Cl.
 CPC ..... *G01N 15/1429* (2013.01); *G01N 15/1012* (2013.01); *G01N 15/1425* (2013.01); *G01N 15/1434* (2013.01); *G01N 15/1459* (2013.01); *G01N 2015/1006* (2013.01); *G01N 2015/1452* (2013.01)

(58) Field of Classification Search
 CPC .......... G01N 15/1429; G01N 15/1434; G01N 15/1459; G01N 15/1012; G01N 15/1425; G01N 2015/1006; G01N 2015/1452; G01N 2015/144
 See application file for complete search history.

(56) References Cited

U.S. PATENT DOCUMENTS 4,857,451 A * 8/1989 Schwartz ........... G01N 15/1012
 435/7.24
6,016,194 A * 1/2000 Girvin ................ G01N 15/1425
 356/335

(Continued)

FOREIGN PATENT DOCUMENTS

EP    1785899 A2    5/2007
JP    09257684 A    10/1997

(Continued)

OTHER PUBLICATIONS

European Patent Office, Office Action and Search Report Issued in Application No. 18183290.8, dated Dec. 11, 2018, 10 pages.

*Primary Examiner* — Michael P LaPage
(74) *Attorney, Agent, or Firm* — Alleman Hall Creasman & Tuttle LLP

(57) ABSTRACT

Provided is a monitoring device having a control part for monitoring, wherein the control part for monitoring has a first data processing part, a second data processing part, and an indication value output part. The first data processing part generates, as indication values for optical axis adjustment, the first indication value showing the intensity of a light-receiving signal obtained from the particle analysis apparatus. The second data processing part generates, as indication values for gain adjustment of the light-receiving signal, the second indication value showing the intensity of a light-receiving signal obtained from the particle analysis apparatus, which is different from the aforementioned first indication value. The indication value output part outputs the first and second indication values to a display device.

4 Claims, 6 Drawing Sheets

(56) References Cited

U.S. PATENT DOCUMENTS

| | | | |
|---|---|---|---|
| 2002/0093641 A1* | 7/2002 | Ortyn | G01N 15/1012 356/28 |
| 2007/0118297 A1* | 5/2007 | Thayer | G06K 9/00147 702/21 |
| 2014/0152986 A1* | 6/2014 | Trainer | G01N 15/0205 356/336 |
| 2016/0018314 A1 | 1/2016 | Hamada et al. | |

FOREIGN PATENT DOCUMENTS

| | | |
|---|---|---|
| JP | 201624024 A | 2/2016 |
| WO | 0217219 A1 | 2/2002 |

* cited by examiner

MONITORING DEVICE FOR ADJUSTING LIGHT IRRADIATION IN PARTICLE ANALYSIS APPARATUS

FIELD OF THE INVENTION

The present invention relates to a monitoring device usable for adjusting irradiation light in a particle analysis apparatus.

BACKGROUND OF THE INVENTION

As a method for optically analyzing particles dispersed in a sample liquid (e.g., blood cells in blood and the like), flow cytometry is known. Flow cytometry includes irradiating predetermined irradiation light to particles in a sample liquid advancing through a flow path in a flow cell, obtaining optical characteristics such as light scattering, light absorbance and the like, and performing analysis such as identification, counting and the like of the particles (e.g., patent documents 1, 2).

A particle analysis apparatus used for analyzing particles in a sample liquid based on flow cytometry is called flow cytometer, and the main constitution comprises, as shown in FIG. 6, a flow cell 110, an optical device (in the example of FIG. 6, a light source device OP11, an optical element (lens and the like) OP12 on the irradiation side, an optical element OP13 on the light receiving side, and a light receiving device OP14) and a control device (not shown). In the particle analysis apparatus of FIG. 6, a sample liquid M10 containing particles X10 flows through a flow path 111 in a flow cell 110, the optical device irradiates irradiation light L10 on the flow cell and receives the light L20 obtained by the irradiation, and the control device processes a light-reception signal obtained from the light receiving device and performs analyses of particles size, classification of particles based on the size, particle frequency distribution and the like. In the particle analysis apparatus exemplified in FIG. 6, the flows of sheath liquids M20, M30 surround doubly on the periphery of the sample liquid M10, and by this constitution, particles flow stably one by one in the flow path.

In the particle analysis apparatus exemplified in FIG. 6, electrodes E10, E20 are formed on the upstream side and the downstream side of the flow path so that the particles can also be measured in the flow cell based on the impedance method (electric resistance method). When a particle X10 passes through an aperture (fine pore) 112, the voltage or current between the aforementioned electrodes changes. The impedance method is a method for specifying the particle size based on the values of voltage and current. A particle analysis apparatus for performing a method that simultaneously conducts flow cytometry and impedance method (also called light-focused flow impedance method) is also encompassed in the particle analysis apparatus for analyzing particles in a sample liquid based on flow cytometry. In the following, the particle analysis apparatus in the present specification is an analysis apparatus provided with at least a constitution for analyzing particles in a sample liquid based on flow cytometry.

Patent Document 1 JP-A-H09-257684
Patent Document 2 JP-A-2016-024024

During production, maintenance and the like of a particle analysis apparatus, the center axis of the flow path of the flow cell is aligned with the optical axis of the irradiation light of the optical device (hereinafter to be also referred to as "optical axis adjustment"), and gain adjustment (adjustment of amplification of light-reception signal, light-receiving sensitivity and the like) of light-reception signals is performed.

For optical axis adjustment, a standard solution for flow cytometry containing standard particles is generally used, and displacement of a flow cell (or displacement of an optical device) needs to be adjusted while observing the intensity of the light-reception signal (=intensity of transmitted light), such that the intensity of the light-reception signal, when the irradiation light is irradiated on the standard particles flowing through the flow path, is lowest due to light absorption, scattering, and the like (namely, such that the irradiation light is best blocked by particles). Therefore, during adjustment of the optical axis, an oscilloscope is utilized to check the intensity of the light-reception signal with high real-time property.

However, the oscilloscope only shows the intensity of the light-reception signal, and determination of whether the gain adjustment of the light-reception signal is appropriate requires other method, for example, by measuring standard substances such as control blood and the like and confirming based on the measurement values and the like. Therefore, adjustment of light irradiation in a particle analysis apparatus (optical axis adjustment and gain adjustment) is time-consuming requiring preparation and operation of a plurality of measuring apparatuses.

The problem of the present invention is to solve the above-mentioned problem and provide a new device for adjusting light irradiation in a flow cytometer with reduced time and labor.

SUMMARY OF THE INVENTION

The main constitution of the present invention for solving the above-mentioned problem is as follows.

[1] A monitoring device for adjusting a light irradiation in a particle analysis apparatus comprising a flow cell for flow a sample liquid containing particles; an optical device for projecting an irradiation light on the flow cell, receiving the light and outputting a light-reception signal; and a control part for processing the light-reception signal and analyzing the particles, the monitoring device comprising a control part for monitoring, wherein the control part for monitoring comprises:

a first data processing part that generates a first indication value indicating the intensity of the light-reception signal obtained from the particle analysis apparatus, as an indication value that changes according to the relative position between the flow cell and the optical axis of the irradiation light in the particle analysis apparatus;

a second data processing part that generates a second indication value indicating the intensity of the light-reception signal, which is different from the first indication value, as an indication value that changes according to the gain adjustment of the light-reception signal in the particle analysis apparatus; and an indication value output part that outputs the first indication value and the second indication value on a display device.

[2] The monitoring device according to [1], wherein the first indication value is a value set in each time section in time sections t1, t2, t3, . . . , tn (n is natural number) obtained by dividing progressing time t by predetermined time length T1, and the maximum value of the intensity of particle-passage signals corresponding to the particles that passed through the flow cell in each time section or a value corresponding to the maximum value, and the second indication value is a value set in each time section in the above-mentioned time sections t1, t2, t3, . . . , tn (n is natural number), and a size having the highest frequency in the size frequency distribution of the particles that passed through the flow cell in each time section or a value corresponding to the size.

[3] The monitoring device according to [1] or [2], wherein the display device has a display screen, and the indication value output part displays the first indication value and the second indication value in each time section plotted in a single graph on the display screen of the display device.

[4] The monitoring device according to any one of [1]-[3], wherein the sample liquid flown in the flow cell of the particle analysis apparatus, when the data processing part of the monitoring device generates the first indication value and the second indication value, is a standard solution for flow cytometry containing standard particles.

[5] The monitoring device according to any one of [1]-[4], wherein the display device accompanies the monitoring device as a part thereof.

[6] The monitoring device according to any one of [1]-[5], accompanying the particle analysis apparatus as a part thereof.

According to the monitoring device of the present invention, a first indication value and a second indication value are output to a display device. The first indication value indicates the intensity of the light-reception signal obtained from the particle analysis apparatus, as an indication value that changes according to the relative position between the flow cell and the optical axis of the irradiation light in the particle analysis apparatus. The second indication value indicates the intensity of the light-reception signal, which is different from the first indication value, as an indication value that changes according to the gain adjustment of the light-reception signal in the particle analysis apparatus. As a result, optical axis adjustment and gain adjustment can be performed, and the efficiency of the adjusting operation is increased. In addition, plural measuring apparatuses including an oscilloscope and the like are not necessary for the adjustment of irradiation light.

BRIEF DESCRIPTION OF THE DRAWINGS

FIG. 1 also shows a schematic constitution of a particle analysis apparatus to be subjected to light irradiation adjustment using the monitoring device, and the relationship between the particle analysis apparatus and the monitoring device during the adjustment.

Figure 1:
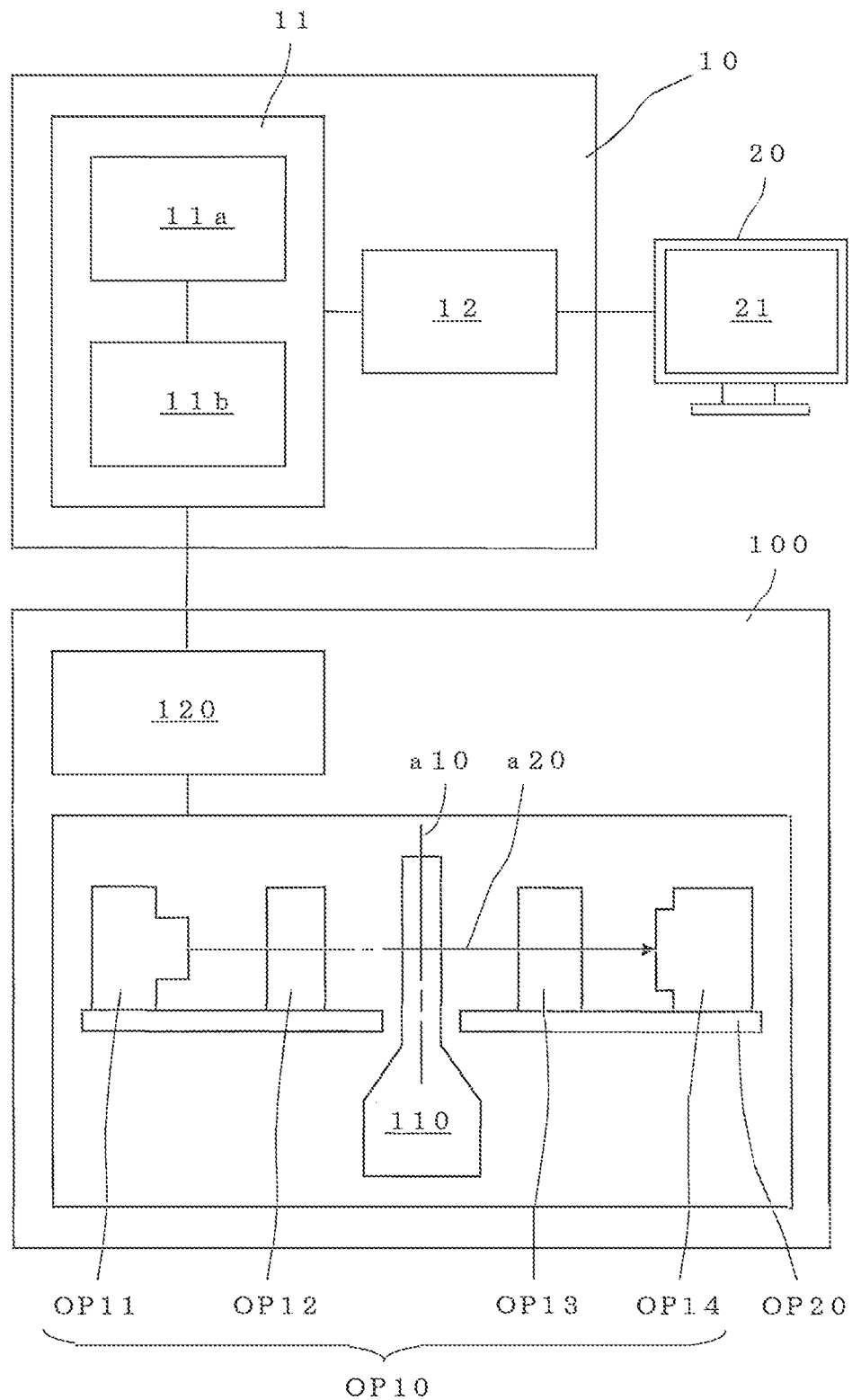
FIG. 1 is a block diagram showing one embodiment of the constitution of the main part of the monitoring device of the present invention.

The reference characters in the Figures show the following: 10; control part for monitoring, 11; data processing part, 11*a*; first data processing part, 11*b*; second data processing part, 12; indication value output part, 20; display device, 21; display screen.

DETAILED DESCRIPTION OF THE INVENTION

The monitoring device of the present invention is explained in detail in the following by referring to the Examples.

FIG. 1 is a block diagram showing one embodiment of the constitution of the main part of the monitoring device, in which the monitoring device is connected to the particle analysis apparatus to adjust light irradiation in the particle analysis apparatus 100. As shown in FIG. 1, the particle analysis apparatus 100 to be adjusted by the monitoring device of the present invention has a flow cell 110, an optical device OP10 and a control part 120 so that the particles in a sample liquid can be analyzed based on flow cytometry.

[Particle Analysis Apparatus in which Irradiation Light should be Adjusted]

A particle analysis apparatus to be adjusted is explained.

Figure 6:
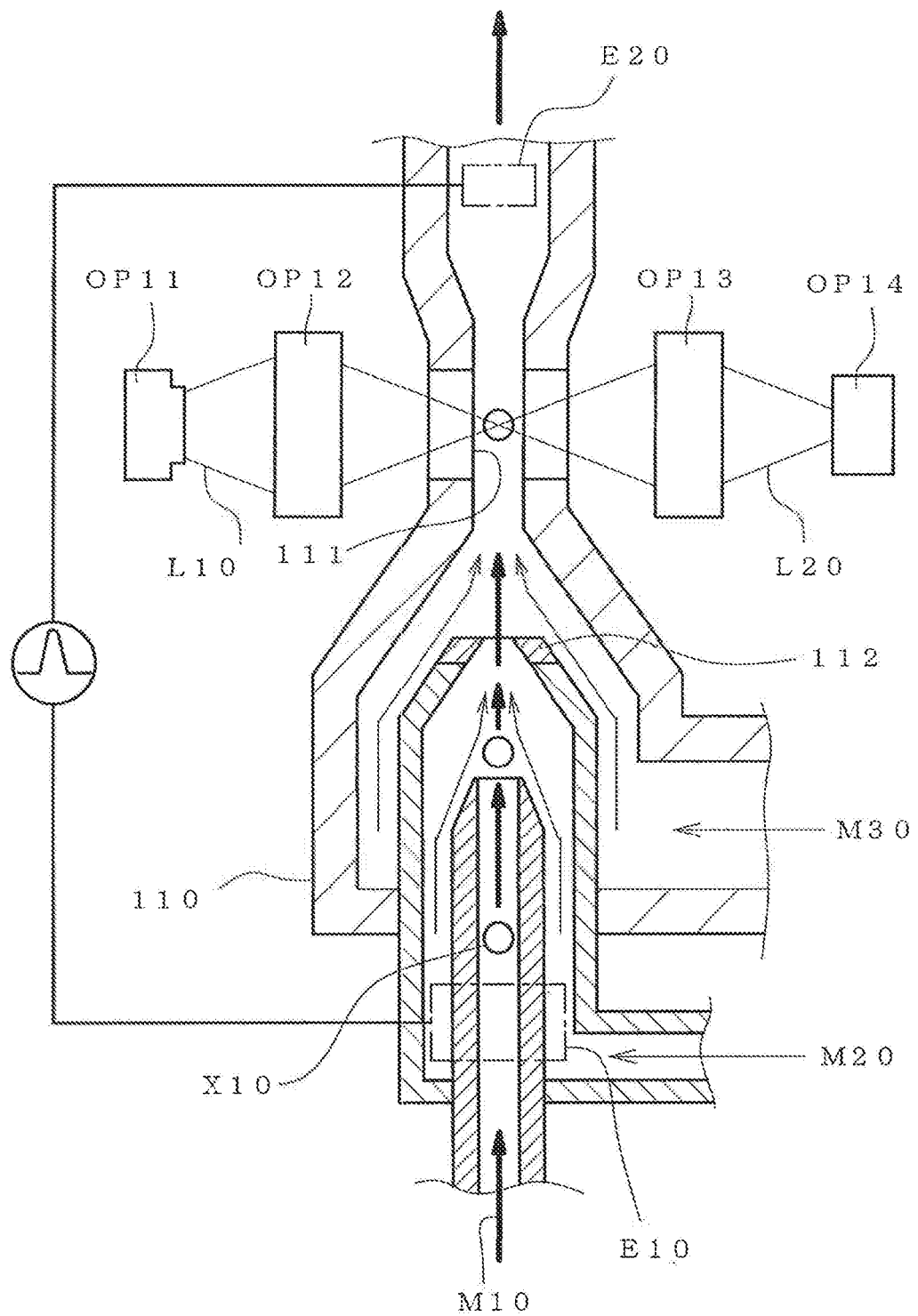
FIG. 6 shows one embodiment of the constitution of a conventional particle analysis apparatus. The constitution of this example permits a light-focused flow impedance method which performs the impedance method and flow cytometry in one flow path.

In the example of FIG. 1, the particle analysis apparatus comprises a flow cell 110 having a flow path for flowing a sample liquid containing particles, as in the particle analysis apparatus shown in FIG. 6. The optical device OP10 comprises: a light source device OP11; an optical element (lens or slit and the like) OP12 on the light-irradiation side; an optical element (lens and the like) OP13 on the light-reception side; a light-receiving device OP14. And the optical device projects an irradiation light on the flow cell 110, and receives the light and outputs a light-reception signal. In the example of FIG. 1, the optical device OP10 of the particle analysis apparatus is configured on the optical bench OP20, and adjustment of the optical axis a20 from the light source device OP11 to the light-receiving device OP14 in the optical device has been completed. In the example of FIG. 1, moreover, the optical device OP10 is fixed on a base plate (not shown) via the optical bench OP20, the flow cell 110 is configured on a transferring mechanism (alignment mechanism), and the optical axis adjustment is performed by moving the flow cell such that the center axis a10 of the flow path of the flow cell and the optical axis a20 of the irradiation light in the optical device intersect or become closer to an intersecting state. While the transferring mechanism for moving the flow cell highly accurately is not shown, it may be a conventionally-known mechanism. As an alternative embodiment of the optical axis adjustment, the flow cell may be fixed and the optical device may be configured on the transferring mechanism. In the optical axis adjustment, it is important to move the flow cell 110 (or the optical device) in a direction perpendicular to the paper surface of FIG. 1 (width direction of the flow path). The control part 120 of the particle analysis apparatus processes light-reception signals output from the aforementioned light-receiving device OP14 and calculates for particle analysis. When a pair of electrodes for performing the impedance method are provided in the flow cell as shown in FIG. 6, the control part also processes electric measurement signals obtained by the electrodes and analyzes particles by combining the flow cytometry.

The control part 120 in the particle analysis apparatus for irradiation light adjustment is preferably constituted to control the action of each part of the apparatus, process (calculate) the light-reception signals sent from the optical device for the analysis, and output the analysis results. While the control part may be constructed using a logic circuit and the like, a computer is appropriate.

[Constitution of the Monitoring Device of the Present Invention]

As shown in FIG. 1, the monitoring device comprises the control part for monitoring 10. The display device 20 may be an external, separate device or a displaying part accompanying the monitoring device. The control part for monitoring 10 has a data processing part 11 and an indication value output part 12. In the example of FIG. 1, the data processing part 11 receives detection signals such as light-reception signals and the like from the control part 120 of the particle analysis apparatus. The data processing part 11 comprises a first data processing part 11a and a second data processing part 11b.

The first data processing part 11a generates the first indication value showing the intensity of the light-reception signal obtained by the particle analysis apparatus 100. The first indication value varies according to the relative position of the center axis a10 of the flow path of the flow cell 110 in the particle analysis apparatus 100 and the optical axis a20 of the irradiation light in the optical device OP10. For example, when the first indication value is the absorbance of particle, the irradiation light is blocked more by the particle as the optical axis adjustment proceeds. Therefore, the absorbance also becomes larger and approaches a value unique to each individual particle. Thus, the first indication value showing the intensity of such light-reception signal can be utilized for monitoring for the optical axis adjustment of the particle analysis apparatus.

On the other hand, the second data processing part 11b also generates the second indication value showing the intensity of the light-reception signal obtained from the particle analysis apparatus 100. The second indication value is different from the first indication value and preferably changes according to the gain adjustment of the light-reception signal in the particle analysis apparatus 100. For example, a standard solution for flow cytometry containing standard particles is used for irradiation light adjustment in the particle analysis apparatus. When the second indication value is an indication value well reflecting the range of frequency distribution of the particle size (e.g., intensity of the light-reception signal near the peak of frequency distribution), as the gain adjustment proceeds, the indication value approaches a known target value examined in advance using the standard solution. Thus, the second indication value showing the intensity of such light-reception signal can be utilized for monitoring for the gain adjustment of the particle analysis apparatus.

The indication value output part 12 outputs the first indication value generated in the first data processing part 11a and the second indication value generated in the second data processing part 11b to the display device 20. In the example of FIG. 1, the first and the second indication values are displayed on a display screen 21 of the display device 20.

With the above constitution, the user (person who adjusts the particle analysis apparatus using the monitoring device) can perform optical axis adjustment and gain adjustment of the particle analysis apparatus while checking the first and the second indication values by the display device.

[Example of Adjustment Procedure]

As the procedures for adjusting the light irradiation of the particle analysis apparatus by using the monitoring device, the following procedures are shown.

(i) A standard solution for flow cytometry containing standard particles is flown in the flow cell of the particle analysis apparatus, and the standard particles are measured by the particle analysis apparatus. The data processing part 11 of the monitoring device receives the light-reception signals output at that time from the light-receiving device or control part of the particle analysis apparatus, the first data processing part 11a and the second data processing part 11b process same and generate the first and second indication values. The generated first and second indication values are output to the display device 20 through the indication value output part 12. In the example of FIG. 1, the display device 20 is a device such as a liquid crystal display having display screen 21 and the like, and the first and second indication values are displayed on the display screen 21.

(ii) the measurement of the standard particles in the aforementioned (i) is continued, during which an optical axis adjustment is performed by changing the relative position of the optical device and the flow cell such that the first indication values displayed on the monitoring device fall within the predetermined range. Depending on the alignment mechanism of the particle analysis apparatus, the optical axis adjustment may be movement of the flow cell or movement of the optical device. When the optical axis adjustment is not appropriate, a light-reception signal appropriately corresponding to the size of the particle cannot be obtained.

(iii) the measurement of the standard particles in the aforementioned (i) is continued, during which a gain adjustment is performed such that the second indication values displayed on the display device fall within the predetermined range. Gain adjustment is also called sensitivity adjustment which includes amplification (or attenuation) of the light-reception signal and the light-reception signal to impart appropriate intensity. Specific operation of the gain adjustment varies depending on the particle analysis apparatus. For example, in an amplifying circuit constituted to achieve gain adjustment by controlling a digital potentiometer, the values of the digital potentiometer are changed from the console panel of a control part in the particle analysis apparatus to perform the gain adjustment. It is also possible to constitute the control program of the monitoring device such that the gain adjustment is performed by changing the values of the digital potentiometer by a monitoring device connected to the control part. When the gain adjustment is not appropriate, for example, the overall width of the intensity of the light-reception signal becomes narrow and incorrect measurement values may be output.

The optical axis adjustment in the above-mentioned (ii) and the gain adjustment in the above-mentioned (iii) are closely related to each other as mentioned below. Either adjustment may be performed first, or performed at the same time, or alternately repeated. The optical axis adjustment is performed first to increase the intensity of the light-reception signal and then the gain adjustment of the light-reception signal is performed. This is the order preferable for efficient adjustment.

[Sample Liquid Used for Adjusting Particle Analysis Apparatus]

Adjustment of the irradiation light of the particle analysis apparatus is preferably performed while flowing the standard solution for flow cytometry containing standard particles in the flow cell. As the standard solution, a conventionally-known standard solution may be used and it is possible to select one suitable for the average particle size of the particles to be the analysis target of the particle analysis apparatus to be adjusted. For example, when the particle analysis apparatus is a blood analysis apparatus for performing analyses such as counting blood cells, classification and the like, the standard solution is exemplified by a dispersing medium (water and the like) containing standard particles (average particle size; about 1-20 µm, material; polystyrene, silica and the like) dispersed therein.

[Control Part for Monitoring in the Monitoring Device of the Present Invention]

The control part for monitoring is preferably constituted to process light-reception signals sent from the control part of the particle analysis apparatus and output them as the first indication value and the second indication value on the display device. While the control part may be constructed using a logic circuit and the like, a computer is appropriate. The control part for monitoring is preferably connected data-communicatively to the control part of the particle analysis apparatus.

As mentioned below, when the monitoring device is a part of the particle analysis apparatus, the control part of the particle analysis apparatus and the control part for monitoring of the monitoring device may be contained in one housing, one control circuit or one control program. The same apparatuses may be constituted as different control parts (control parts in different housings, control circuits of other system in one housing, different control programs to be executed separately for each control mode and the like).

[First Indication Value]

As mentioned above, the first indication value is an indication value showing the intensity of the light-reception signal obtained from the particle analysis apparatus, and utilizable for monitoring for optical axis adjustment. As a preferable first indication value, the intensity of the particle-passage signal, which is a light-reception signal when particles (standard particles) pass through a light irradiation part of the flow cell can be mentioned. An indication value showing the absorbance and light transmittance based on the intensity of the particle-passage signal can be preferably utilized for monitoring for the optical axis adjustment since it changes in response to the optical axis adjustment. Particularly, the maximum value of the intensity of the particle-passage signal is an indication value preferably utilized for the optical axis adjustment since it show a large numerical value and easily recognized by the user. The overall width (from the minimum value (may be zero) to the maximum value) of an indication value showing the intensity, absorbance and light transmittance of the particle-passage signal is preferably divided into, for example, 256 steps (0-255), 1024 steps (0-1023) and the like. This facilitates handling of the data when the control part (computer) processes the data to determine the frequency distribution. Each section divided as mentioned above is also called a channel, and the name used for each section is 0 channel-255 channel (or 1 channel-256 channel). In the following explanation, the indication values showing the intensity of particle-passage signals and light transmittance (or absorbance) are divided into 256 steps and the name of each section is 0 channel-255 channel.

An embodiment of the first indication value more preferable for the users who adjust the particle analysis apparatus is mentioned below together with a more preferable embodiment of the second indication value.

[The Second Indication Value]

As mentioned above, the second indication value is also an indication value showing the intensity of the light-reception signal obtained from the particle analysis apparatus. The second indication value is different from the first indication value, changes according to the gain adjustment of the light-reception signal in the particle analysis apparatus, and is utilizable as an indication value for monitoring for the gain adjustment of the light-reception signal. A preferable second indication value is a channel having the highest frequency in the size frequency distribution of particles (standard particles) flowing in the flow path of the flow cell within a predetermined time (i.e., frequency distribution of absorbance and light transmittance generated from the intensity of the particle-passage signal) (hereinafter to be also called the peak channel). The peak channel of the frequency distribution of the standard particles is known. Therefore, whether the gain adjustment is appropriate can be known by using the standard particles for the adjustment and confirming the peak channel thereof. In addition, since the standard particles have various sizes, the maximum value of the intensity of the particle-passage signal also varies due to the size variation. In contrast, the peak channel of the frequency distribution of the particle-passage signal of each particle shows smaller variation compared to that of the maximum value of the intensity of the particle-passage signal (the first indication value) when the sample number is sufficient. Thus, the peak channel can be an indication value well reflecting the position of the frequency distribution of the particle size. Therefore, the peak channel can be preferably utilized for monitoring for gain adjustment as an indication value that preferably varies according to the gain adjustment of the light-reception signal in the particle analysis apparatus. It is also possible to use a channel with the second or third highest frequency in the frequency distribution instead of the peak channel.

An embodiment of the second indication value more preferable for the users who adjust the particle analysis apparatus is mentioned below together with a more preferable embodiment of the first indication value.

As mentioned above, as the target values of the first indication value and the second indication value when the particle analysis apparatus is adjusted, for example, those obtained by performing the optical axis adjustment and the gain adjustment of the particle analysis apparatus in advance by the conventional adjustment method, flowing the standard solution in the particle analysis apparatus, and measuring the first indication value and the second indication value at that time.

[Preferable Embodiment of the First Indication Value and the Second Indication Value]

Figure 2:
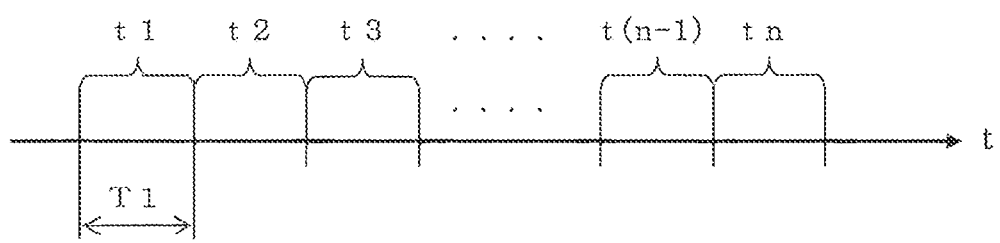
FIG. 2 explains preferable time intervals (time section) in obtaining particle-passage signals for generating the first and second indication values preferable for the user in the present invention.

In a preferable embodiment of the first and second indication values, as shown in FIG. 2, particles (standard particles) are flown in the flow cell, the progressing time t is divided by the predetermined time length T1 to form time sections t1, t2, t3, . . . , tn (n is a natural number), and the first and the second indication values generated in each time section are displayed on the display screen of the display device with the passage of time. Here, the value of the aforementioned n is not particularly limited and it may increase automatically and continuously until the user completes the adjustment and stops the operation of the particle analysis apparatus (or stops the operation of the monitoring device). In addition, t1-tn may be repeated until a predetermined value is set as the value of n and the user completes the adjustment and stops the operation of the particle analysis apparatus.

While the time length T1 is not particularly limited, in consideration of the speed of the operation for adjusting the optical axis and the like while a human monitors the first and second indication values in each time section, about 300 msec-500 msec is preferable. In the example of the monitoring device actually manufactured, good adjustment is possible at the time length T1=about 400 msec. When the time length T1 is lower than 300 msec, the number of time sections becomes too large depending on the particle analysis apparatus, it becomes difficult to display a graph showing the indication value throughout the adjustment time and, when it exceeds 500 msec, the responsiveness becomes poor and the adjustment becomes far from easy.

When the predetermined time length T1 is within the above-mentioned range, the user can complete adjustment of the optical axis and the gain before the value of n in the time sections t1, t2, t3, . . . , tn reaches about 60-70 in the general particle analysis apparatus.

The number of particles flowing in the flow cell (number of particle-passage signals) in each time section (t1, t2, . . . ) varies depending on the flow rate in the flow cell and the density of particles (standard particles) in the sample liquid (standard solution). It is, for example, about 50-100 per time section.

[Preferable Embodiment of the First Indication Value in Each Time Section]

A preferable embodiment of the first indication value in each time section (t1, t2, . . . ) is the maximum value of the intensity of particle-passage signals corresponding to the particles that passed through the flow cell in each time section or a value corresponding to the maximum value. In the following, the maximum value of the intensity of the particle-passage signal or a value corresponding thereto is called "maximum channel".

The "maximum channel" also varies depending on the gain adjustment.

When the gain adjustment is appropriately performed and the indication values showing the intensity of particle-passage signals and light transmittance (or absorbance) are divided into 0 channel-255 channel, and the standard solution for flow cytometry and containing standard particles is used, the maximum channel after adjustment becomes, for example, about 150-170. The user can adjust the optical axis so that the first indication value falls within the aforementioned range while monitoring the second indication value displayed on the display device and adjusting the gain.

[Preferable Embodiment of the Second Indication Value in Each Time Section]

A preferable embodiment of the second indication value in each time section is, in the frequency distribution of the size of the particles that passed through the flow cell in the same time section as in the above-mentioned first indication value (t1, t2, t3, . . . ), a size having the highest frequency in each time section or a value corresponding to the size. A large particle means a high absorbance.

When the gain is adjusted by monitoring the peak channel in each time section, it is also important that the optical axis is appropriately adjusted. The peak channel in an appropriate frequency distribution obtained under appropriate optical axis adjustment is a preferable indication value for gain adjustment.

When the indication values showing the intensity of particle-passage signals and absorbance are divided into 0 channel-255 channel, and the standard solution is used, the peak channel after adjustment becomes, for example, about 130-150. The user can adjust the gain so that the second indication value falls within the aforementioned range while monitoring the first indication value displayed on the display device and adjusting the optical axis.

[Preferable Display Embodiment of the First and Second Indication Values]

In a preferable embodiment of the present invention, the aforementioned first and second indication values in each time section are displayed in one or both of one graph and one table on the display screen of the display device through the indication value output part. The first and second indication values may be displayed separately by switching display contents of the display screen or may be simultaneously displayed in one screen.

Figure 3:
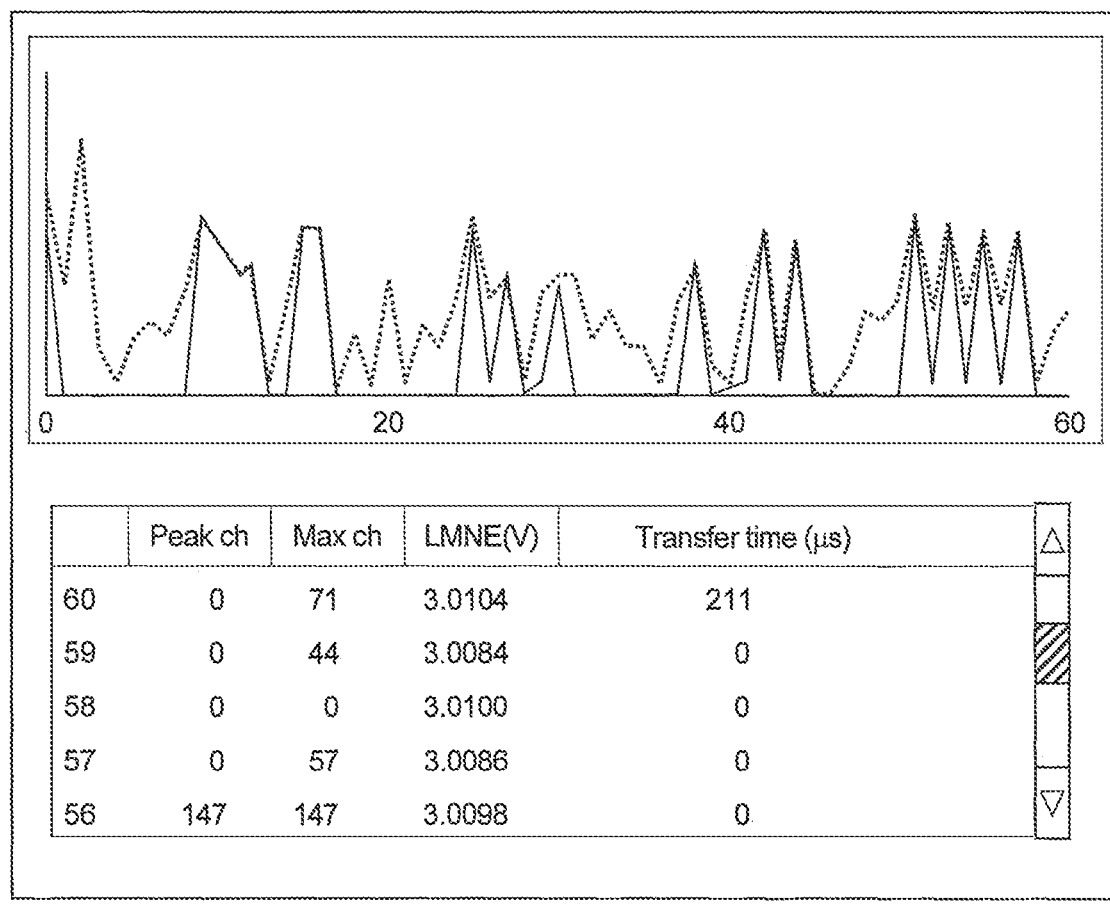
FIG. 3 illustrates a display screen in which the first and second indication values are displayed on one graph and one table in a preferable embodiment of the present invention. The first and second indication values displayed on the graph and the table in this Figure are those before adjusting the irradiation light.
Figure 4:
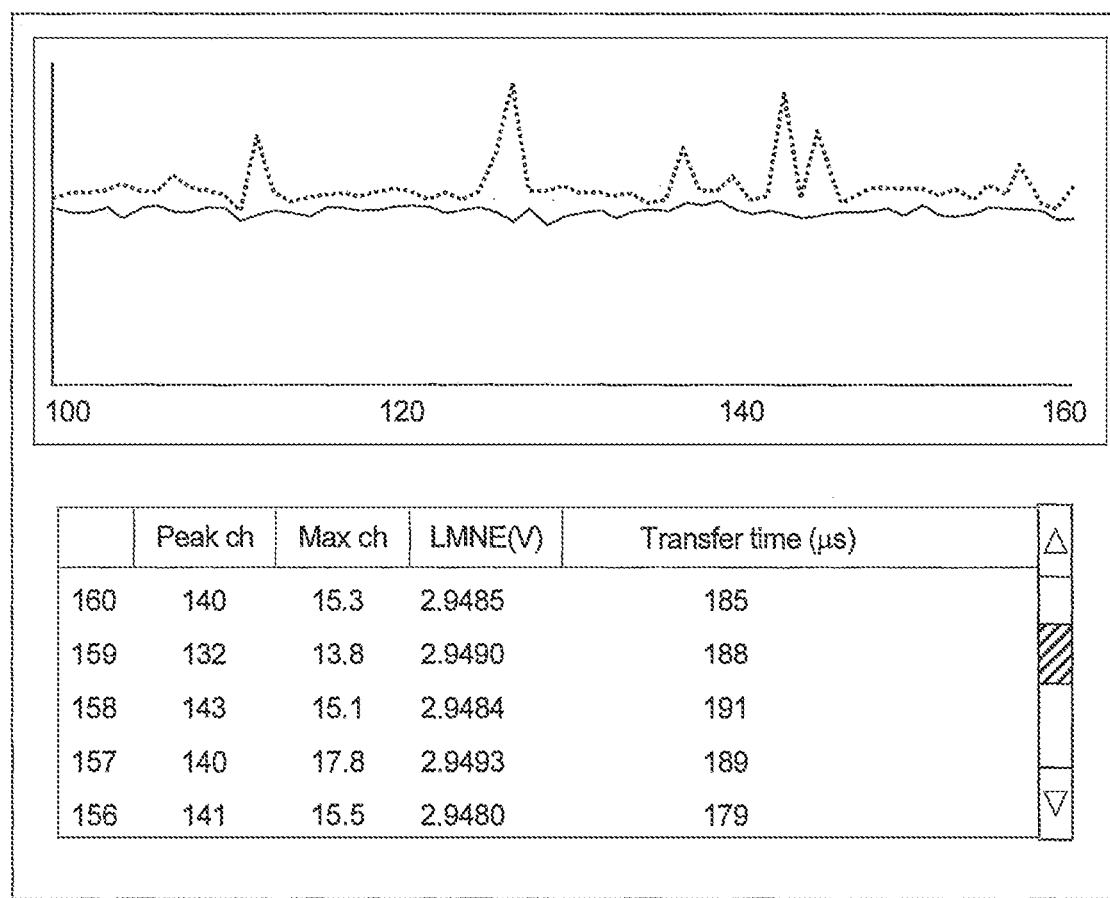
FIG. 4 illustrates, similar to FIG. 3, a display screen in which the first and second indication values are displayed on one graph and one table in a preferable embodiment of the present invention. The first and second indication values displayed on the graph and the table in this Figure are those after adjusting the irradiation light.

FIG. 3, FIG. 4 show examples of a display screen simultaneously displaying the first and second indication values on one graph and one table in one screen. FIG. 3 shows the state before adjusting the optical axis and the gain, and FIG. 4 shows the state after adjusting the optical axis and the gain. The numbers on the horizontal axis of the graph and the left end of the table indicate the numbers assigned to the time sections (t1, t2, t3, . . . ). The horizontal axis of the graph shows the numerical value of the channel indicating the absorbance. In the graphs in these Figures, the first indication value (maximum channel) is shown with a dotted line and the second indication value (peak channel) is shown with a solid line, whereby two polygonal lines are distinguished (the detail is mentioned later). In the examples of FIG. 3, FIG. 4, the graphs are displayed on the upper side of the display screens, and the tables are displayed on the lower side of the display screens. In the two polygonal lines shown in the graphs, a new indication value may appear from the right end of the graph and the two polygonal lines may move to the left of the graph with the progress of time and may disappear from the screen sequentially from the old indication values. Similarly, in the tables, new indication values of the first indication value (maximum channel is indicated as "Max ch") and the second indication value (peak channel is indicated as "Peak ch") may appear from the upper end of the tables, old indication values may move sequentially in the lower direction and disappear from the screen sequentially from the old indication values. The old indication values can also be displayed in the screen by scrolling.

Also, a constitution may be adopted in which the maximum value of the time sections is previously set, and when the time sections exceed the maximum value thereof, the previous display is deleted and the subsequent first and second indication values are displayed in a new graph and a new table from time section 1.

The first and second indication values may be displayed in either one of a graph and a table. The user can perform adjustment efficiently when they are simultaneously displayed in a graph and a table, since the user can visually understand the degree of adjustment on the graph while checking the numerical values in the table.

The first and second indication values shown in a graph are preferably displayed to be distinguishable from each other. For example, thin lines and thick lines as well as the dotted line (or dashed line) and the solid line in FIG. 3, FIG. 4, lines of different colors (for example, the first indication value shown by a red line and the second indication value shown by a blue line), dots of different patterns or combinations thereof may be used for display.

In the examples of FIG. 3, FIG. 4, in addition to the first indication value (Max ch; maximum channel) and the second indication value (Peak ch; peak channel) in each time section, for checking, the maximum voltage value of absorbance (instantaneous value) is also shown in the column of the item "LMNE(V)" as the value of the actual light-reception signal (voltage value) corresponding to the first indication value in each time section.

In the examples of FIG. 3, FIG. 4, in the particle analysis apparatus used for performing the light-focused flow impedance method shown in FIG. 6, the movement time of the particles from the aperture 112 (position of impedance measurement) to the position of light irradiation is also shown in the column of the item "Transfer time" for checking.

When these indication values other than the first and second indication values and measurement values are displayed in parallel, it is possible to confirm the flow rate of the sample liquid (standard solution) in the flow cell while adjusting the irradiation light.

Figure 5:
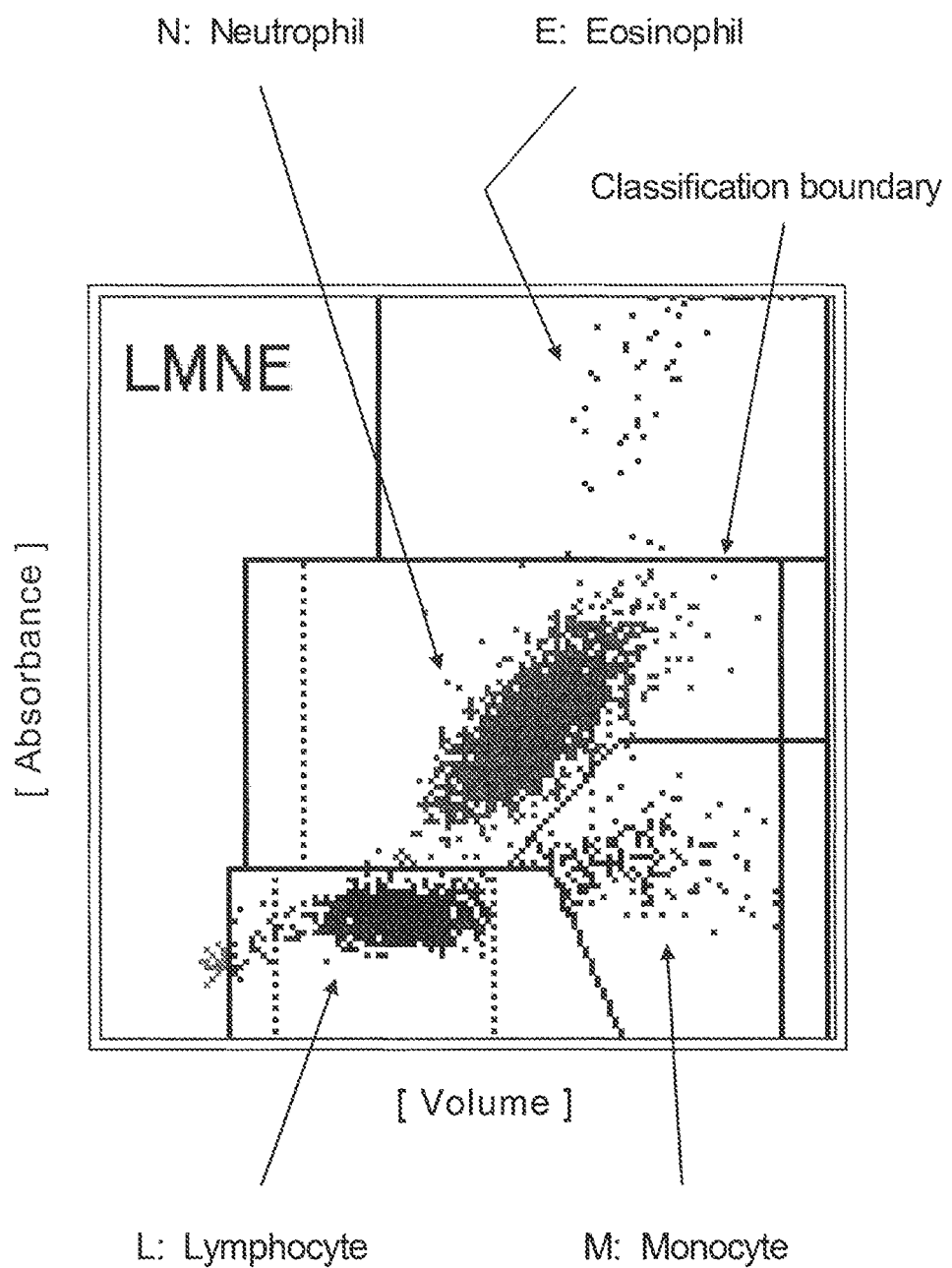
FIG. 5 is a scattergram showing one embodiment of particle analysis by a particle analysis apparatus, in which optical axis adjustment and gain adjustment were appropriately conducted.

FIG. 5 is a scattergram showing one embodiment of particle analysis by a particle analysis apparatus, in which optical axis adjustment and gain adjustment were appropriately conducted. The particle analysis apparatus in the example of this Figure is used for performing the light-focused flow impedance method shown in FIG. 6. To obtain a scattergram as in FIG. 5, a sample liquid that has been processed for hemolysis, dilution and staining of the whole blood is used, absorbance is calculated for each blood cell from the light-reception signal of flow cytometry, and the volume is calculated from the measurement output by the electric resistance method. Then, the calculated value (volume, absorbance) for each blood cell is plotted on an X-Y plane consisting of the X-axis (horizontal axis corresponding to volume) and the Y-axis (vertical axis corresponding to absorbance). The scattergram of FIG. 5 is also called LMNE matrix and preferably shows the manner of distribution of 4 kinds of white blood cell, namely, lymphocyte (L), monocyte (M), neutrophil (N) and eosinophil (E).

Using the particle analysis apparatus appropriately performing optical axis adjustment and gain adjustment, a scattergram effectively utilizing the entire display region as a region to be plotted and easy to understand for viewers, as the one shown in FIG. 5, can be obtained.

The specimen to be analyzed by the particle analysis apparatus is not particularly limited, and may be a liquid containing ceramic particles and resin particles and the like. The usefulness of the present invention is remarkably exhibited when it is blood containing blood cells (red blood cell, white blood cell and the like) as particles to be analyzed.

In the example of FIG. 1, the monitoring device of the present invention has been explained as a device separate from the particle analysis apparatus to be adjusted. The monitoring device may be not only such embodiment but also a device accompanying the particle analysis apparatus as a part thereof.

The display device may be integral with the monitoring device of the present invention or a separate display device (liquid crystal display and the like) connected to the monitoring device. In addition, the display device may be a printer or a meter (indicator display indication value with indicating needle or lamp).

When the monitoring device and the particle analysis apparatus to be adjusted are constituted as a single particle analysis apparatus, the control part for monitoring of the monitoring device and the control part of the particle analysis apparatus may be constituted as a single control part or may be provided separately. When the control part for monitoring of the monitoring device and the control part of the particle analysis apparatus are provided separately, an interface for connecting these control parts to each other and transmitting a light-reception signal, an operation command, and the like may be provided as appropriate.

The first and second data processing parts of the control part for monitoring in the monitoring device may be configured to generate the first and second indication values by utilizing the data processed to show frequency distribution in the control part of the particle analysis apparatus. In addition, the first and second data processing parts may be configured to be able to directly process the light-reception signal (particle-passage signal) without using the processing by the control part of the particle analysis apparatus and generate the first and second indication values.

INDUSTRIAL APPLICABILITY

Using the monitoring device of the present invention, the optical axis adjustment and the gain adjustment can be performed simultaneously by watching one screen when adjusting the light irradiation in the particle analysis apparatus, the efficiency of the adjustment work of the irradiation light is improved and the trouble of adjusting the light irradiation can be further reduced.

The invention claimed is:

1. A monitoring device for adjusting a light irradiation in a particle analysis apparatus comprising: a flow cell for flowing a sample liquid containing particles; an optical device for projecting an irradiation light on the flow cell, receiving the light and outputting a light-reception signal; and a controller for processing the light-reception signal and analyzing the particles, the monitoring device comprising: a monitoring controller for monitoring, wherein the monitoring controller for monitoring is configured to:

generate a first indication value indicating the intensity of the light-reception signal obtained from the particle analysis apparatus, as an indication value that changes according to the relative position between the flow cell and the optical axis of the irradiation light in the particle analysis apparatus;

generate a second indication value indicating the intensity of the light-reception signal, which is different from the first indication value, as an indication value that changes according to the gain adjustment of the light-reception signal in the particle analysis apparatus; and output the first indication value and the second indication value on a display device, wherein the first indication value is a value set in time sections t1, t2, t3, . . . , tn (n is natural number) obtained by dividing progressing time t such that each time section has a predetermined time length T1, and having a maximum value of an intensity of particle-passage signals corresponding to the particles that passed through the flow cell in each time section, the second indication value is a value set in the above-mentioned time sections t1, t2, t3, . . . , tn (n is natural number), and having a highest frequency in a size frequency distribution of the particles that passed through the flow cell in each time section, and wherein the sample liquid flown in the flow cell of the particle analysis apparatus, when the monitoring controller generates the first indication value and the second indication value, is a standard solution for flow cytometry containing standard particles.

2. The monitoring device according to claim 1, wherein the display device has a display screen, and
   the monitoring controller is configured to display the first indication value and the second indication value in each time section plotted in a single graph on the display screen of the display device.

3. The monitoring device according to claim 1, wherein the monitoring device comprises the display device.

4. The monitoring device according to claim 1, wherein the monitoring device comprises the particle analysis apparatus.

* * * * *